(12) United States Patent
Yanagida et al.

(10) Patent No.: US 9,352,399 B2
(45) Date of Patent: May 31, 2016

(54) DRILL

(75) Inventors: Kazuya Yanagida, Anpachi-gun (JP);
Koichiro Naruke, Anpachi-gun (JP)

(73) Assignee: MITSUBISHI MATERIALS CORPORATION, Tokyo (JP)

(*) Notice: Subject to any disclaimer, the term of this patent is extended or adjusted under 35 U.S.C. 154(b) by 165 days.

(21) Appl. No.: 14/009,403

(22) PCT Filed: Apr. 11, 2012

(86) PCT No.: PCT/JP2012/059864
§ 371 (c)(1),
(2), (4) Date: Oct. 2, 2013

(87) PCT Pub. No.: WO2012/141194
PCT Pub. Date: Oct. 18, 2012

(65) Prior Publication Data
US 2014/0023448 A1    Jan. 23, 2014

Related U.S. Application Data

(60) Provisional application No. PCT/JP2012/059864, filed on Apr. 11, 2012.

(30) Foreign Application Priority Data

Apr. 15, 2011 (JP) .................. 2011-091115

(51) Int. Cl.
*B23B 51/02* (2006.01)
*B23B 51/00* (2006.01)

(52) U.S. Cl.
CPC ................. *B23B 51/00* (2013.01); *B23B 51/02* (2013.01); *B23B 2251/04* (2013.01); *B23B 2251/082* (2013.01); *B23B 2251/085* (2013.01); *B23B 2251/14* (2013.01); *B23B 2251/18* (2013.01); *Y10T 408/9095* (2015.01); *Y10T 408/9097* (2015.01)

(58) Field of Classification Search
CPC ............ B23B 2251/14; B23B 2251/18; B23B 2251/28; Y10T 408/9097
See application file for complete search history.

(56) References Cited

U.S. PATENT DOCUMENTS 4,561,813 A    12/1985  Schneider
4,759,667 A    7/1988   Brown
(Continued)

FOREIGN PATENT DOCUMENTS

DE    19605157 A1 *   9/1996   ............. B23B 51/00
DE    102005014729 A1 *   3/2006   ............. B23B 35/00
(Continued)

OTHER PUBLICATIONS

Extended European Search Report mailed Jul. 29, 2014 for the corresponding European Application No. 12771161.2.
(Continued)

*Primary Examiner* — Eric A Gates
*Assistant Examiner* — Donte Brown
(74) *Attorney, Agent, or Firm* — Leason Ellis LLP.

(57) ABSTRACT

A drill comprises a drill body that is rotatable on an axis. Chip evacuating flutes, which are open on front flanks of the drill body and are extended rearwards, are formed in a periphery of the drill body on its front side. Cutting edges are formed along ridge lines where the front flanks intersect with wall surfaces of the chip evacuating flutes facing a drill rotating direction. At least first and second front flanks are formed on the front flanks in order of their locations in the drill rotating direction from its leading side to its trailing side. A clearance angle of the second front flank is greater than that of the first front flank. Intersection lines of the first and second front flanks cross the cutting edges.

5 Claims, 7 Drawing Sheets

(56) References Cited

U.S. PATENT DOCUMENTS

| | | | |
|---|---|---|---|
| 4,983,079 A * | 1/1991 | Imanaga et al. | 408/230 |
| 6,923,602 B2 * | 8/2005 | Osawa et al. | 408/230 |
| 7,241,085 B2 * | 7/2007 | Frisendahl | 408/144 |
| 7,252,465 B2 * | 8/2007 | Lindblom | 408/230 |
| 7,530,772 B2 * | 5/2009 | Reinhardt et al. | 408/230 |
| 2008/0138164 A1 | 6/2008 | Chen et al. | |
| 2010/0215452 A1 | 8/2010 | Jindai et al. | |
| 2011/0200403 A1* | 8/2011 | Gruber | 408/1 R |
| 2012/0076597 A1* | 3/2012 | Krenzer et al. | 408/227 |
| 2012/0082524 A1 | 4/2012 | Matsuda et al. | |
| 2012/0087753 A1* | 4/2012 | Kataoka et al. | 408/1 R |
| 2015/0104265 A1* | 4/2015 | Itoh et al. | 408/230 |

FOREIGN PATENT DOCUMENTS

| | | | | |
|---|---|---|---|---|
| DE | 102006025294 A1 * | 12/2007 | | B23B 51/02 |
| DE | 102009030689 A1 * | 12/2009 | | B23B 51/02 |
| EP | 1396303 A2 * | 3/2004 | | B23B 51/02 |
| FR | 2793176 A1 * | 11/2000 | | B23B 51/02 |
| JP | 04-025308 A | 1/1992 | | |
| JP | 09-136206 A | 5/1997 | | |
| JP | 3215497 B | 10/2001 | | |
| JP | DE 102005014729 A1 * | 3/2006 | | B23B 51/0018 |
| JP | 2009-23055 A | 2/2009 | | |
| JP | 2009083092 A * | 4/2009 | | B23B 51/06 |
| JP | 2011-20256 A | 2/2011 | | |
| JP | 2013075339 A * | 4/2013 | | B23B 51/00 |
| WO | WO-2009/054400 A | 4/2009 | | |
| WO | WO 2012149916 A1 * | 11/2012 | | B23B 51/02 |

OTHER PUBLICATIONS

International Search Report mailed May 15, 2012 for the corresponding PCT Application No. PCT/JP2012/059864.

Office Action mailed May 19, 2015 for the corresponding Japanese Application No. 2011-091115.

* cited by examiner

DRILL

CROSS-REFERENCE TO RELATED PATENT APPLICATIONS

This application is a U.S. National Phase Application under 35 U.S.C.§371 of International Patent Application No. PCT/JP2012/059884, filed Apr. 11, 2012, and claims the benefit of Japanese Patent Application No. 2011-091115, filed Apr. 15, 2011, all of which are incorporated by reference herein in their entireties. The International Application was published in Japanese on Oct. 18, 2012 as International Publication No. WO/2012/141194 under PCT Article 21(2).

FIELD OF THE INVENTION

The present invention relates to a drill in which a front flank of a drill body comprises at least two flanks, namely, first and second flanks.

BACKGROUND OF THE INVENTION

For example, Patent Document 1 mentions such a drill wherein:

front flanks providing a pair of front cutting ridges and a chisel edge by cross thinning, are formed at the front of the drill body; and first and second flanks are formed on each front flank.

Patent Document 2 also mentions a drill wherein:

the front flanks comprise n flanks, namely, first to $n^{th}$ flanks ($n \geq 3$); and coolant holes are open on each boundary between a flank and the subsequent flank, except on the boundary between first and second flanks.

PRIOR ART

Patent Documents

[Patent Document 1]
Japanese Patent Publication No. 3215497
[Patent Document 2]
Japanese Unexamined Patent Application Publication No. H09-136206

Problems that the Invention is to Solve

However, Patent Document 1 discloses that "a linear-shaped ridgeline L, along which a first flank 3 and a second flank 4 intersect, is formed as a diametric line passing through the center point on the axis". That is, in the drills disclosed in Patent Documents 1 and 2, an intersection line of the first and second flanks crosses the rotational axis of the drill body; and the intersection line extends so as to pass through the rotational center of the drill body, on the front flank.

Thus, a clearance angle of the first flank positioned in the leading direction of the drill rotating direction, determines a clearance angle of the cutting edge as well as a thinning edge formed by a web thinning process.

Therefore, if the clearance angle of the first flank is large, the wedge angle becomes small throughout the cutting edge and then the strength of the cutting edge also decreases. Particularly, in a case of high-speed cutting operation, such decrease in strength causes non-uniform flank wear and/or chipping to occur easily at the cutting edge on the outer periphery side of the drill body where the peripheral velocity is higher than that of the inner periphery side. On the other hand, if the clearance angle of the first flank is small, the wedge angle becomes large and then the strength of the cutting edge is secured. However, in such a structure, an abnormal increase in thrust load results in excessive wear that is caused from the front flank being interrupted which occurs near the rotational center on the inner periphery side of the drill body.

This invention is made in light of the aforementioned background and aims to provide a drill in which:

the occurrence of non-uniform flank wear and/or of chipping at the cutting edge is prevented on the outer periphery side, and interruption of flank is also prevented on the inner periphery side.

SUMMARY OF THE INVENTION

Technical Solution

In order to solve the aforementioned problem and to further accomplish these aims, a drill according to the present invention includes:

a drill body rotatable on an axis;

chip evacuating flutes, which are open on front flanks of the drill body and are extended rearwards, formed in a periphery of the drill body on its front side; and cutting edges formed along ridge lines where the front flanks intersect with wall surfaces of the chip evacuating flutes facing a drill rotating direction.

In the above drill, at least two front flanks, namely, first and second front flanks are formed on the front flanks in order of their locations in the drill rotating direction from its leading side to its trailing side;

a clearance angle of the second front flank is greater than that of the first front flank; and intersection lines of the first and second front flanks cross the cutting edges.

In the drill with the above structure, the intersection lines of the first front flanks and the second front flanks cross the cutting edges on the front flanks, wherein the first front flanks are positioned on the leading side of the drill rotating direction, and the second flanks are positioned on the trailing side of the drill rotating direction. Thus, to an inner periphery side from the crossing points, the cutting edges are formed on the second front flanks positioned on the trailing side of the drill rotating direction and having a greater clearance angle than that of the first front flanks. In contrast, to an outer periphery side from the crossing points, the cutting edges are formed on the first front flanks positioned on the leading side of the drill rotating direction and having a smaller clearance angle than that of the second front flanks.

Therefore, on the outer periphery side of the drill body, a wedge angle of the cutting edges can increase. Such large wedge angle enables their strength to be secured, makes flank wear uniform, and can prevent occurrence of chipping. On the other hand, on the inner periphery side of the drill body, a clearance angle of the cutting edges can increase. Such cutting edges with a great clearance angle can prevent interruption of the flank. Therefore, on the front flank adjacent to the rotational center, wear caused by the aforementioned interruption decreases. Further, since an abnormal increase in thrust load can be prevented, excessive thrust is not necessary, and then the drill body can become free from breakage.

If the drill provides thinning edges formed by applying a thinning process on the inner periphery side of the cutting edges, the intersection lines of the first and second front flanks may cross the thinning edges. In this case, the cutting edge provided on the first front flank can be of a long length, wear of the cutting edge can become highly uniform, and then the occurrence of chipping can be more reliably prevented.

On the other hand, even if the drill provides thinning edges on the inner periphery side of the cutting edges, the intersection lines of the first and second front flanks may cross the cutting edges in the outer periphery side from the thinning edges. In this case, since the cutting edge on the second front flank with a great clearance angle can be of a long length, decrease in cutting resistance can be achieved while maintaining a sufficient strength of the cutting edge on the outer periphery side of the drill body.

Advantageous Effects

As in the description above, the present invention provides a drill wherein:

on the outer periphery side of the drill body, sufficient strength of the cutting edges are secured, and thus occurrence of non-uniform flank wear and/or of chipping at the cutting edges can be prevented; and on the inner periphery side, interruption of the flank is prevented, excessive wear which occurs around the rotational center of the front flank is controlled, and thus an abnormal increase in thrust load can be checked.

BRIEF DESCRIPTION OF THE DRAWINGS

These and other features and advantages of the present invention will become more readily appreciated when considered in connection with the following detailed description and appended drawings, wherein like designations denote like elements in the various views, and wherein:

FIG. 5(a) is an enlarged front view thereof. FIG. 5(b) is an enlarged side view as seen from a rake face side thereof.

FIG. 6(a) is an enlarged front view thereof. FIG. 6(b) is an enlarged side view as seen from a rake face side thereof.

FIG. 7(a) is an enlarged front view thereof. FIG. 7(b) is an enlarged side view as seen from a rake face side thereof.

DESCRIPTION OF NOTATION

1 DRILL BODY
3 FRONT FLANK
3A FIRST FRONT FLANK
3B SECOND FRONT FLANK
3C THIRD FRONT FLANK
4 CHIP EVACUATING FLUTE
5 RAKE FACE
6 CUTTING EDGE
6A THINNING EDGE
O AXIS OF DRILL BODY
T DRILL ROTATING DIRECTION
L INTERSECTION LINE OF FIRST FRONT FLANK 3A AND SECOND FRONT FLANK 3B
M INTERSECTION LINE OF SECOND FRONT FLANK 3B AND THIRD FRONT FLANK 3C
α a FIRST CLEARANCE ANGLE
β SECOND CLEARANCE ANGLE

DETAILED DESCRIPTION OF THE INVENTION

[Best Mode of Carrying Out the Invention]

Figure 1:
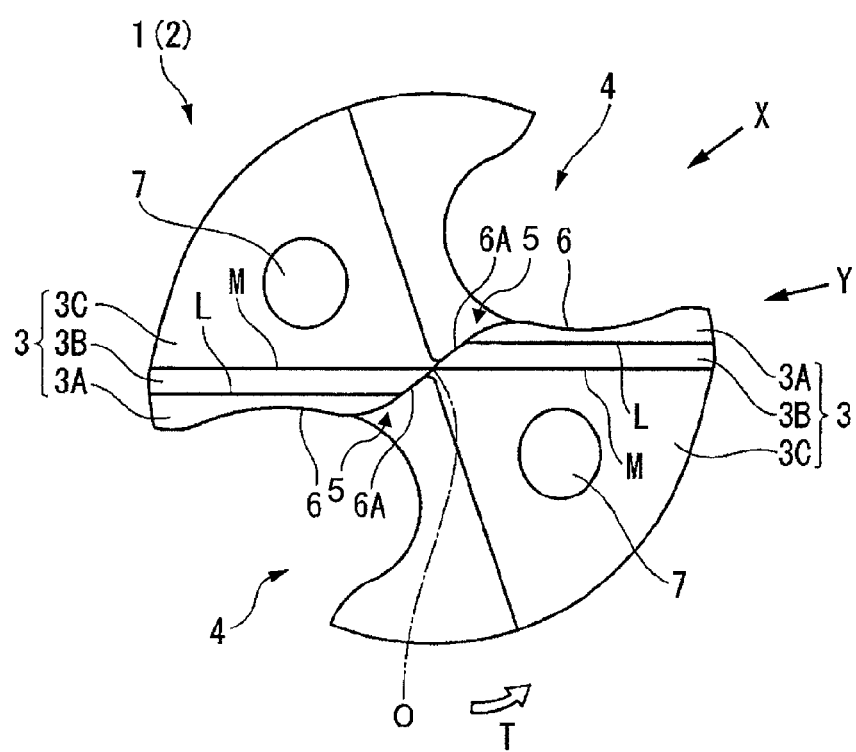
FIG. 1 is a front view of a drill that is a first embodiment of the present invention.
Figure 2:
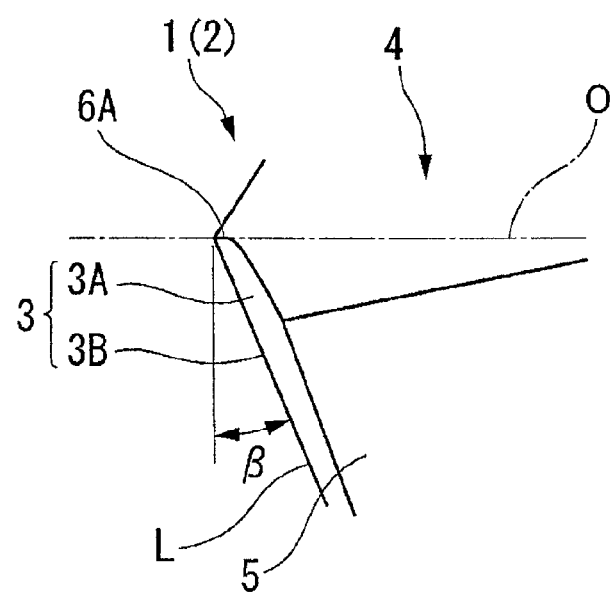
FIG. 2 is an enlarged side view as seen from the direction X in FIG. 1 (a view as seen from a direction along the thinning edge 6A in FIG. 1).
Figure 3:
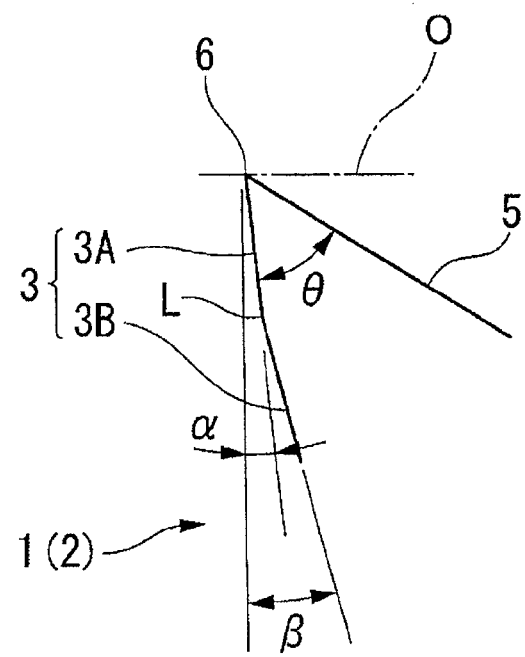
FIG. 3 is an enlarged side view as seen from the direction Y in FIG. 1 (a view as seen from a direction of the linear line from the outer periphery end of the cutting edge 6 to the axis O).

FIGS. 1 to 3 show a first embodiment of the present invention.

In this embodiment, a drill body 1 is made of hard material such as cemented carbide or the like, has an almost columnar shape around an axis O as the center axis thereof, and has a shank in the rear portion, not shown in the figures. The shank is fixed to the spindle of a machining tool.

Further, when rotating the drill body 1 in a drill rotating direction T on the axis O, by feeding the drill body 1 along the axis O toward its front side, cutting edge portion 2 formed at the front side of the drill body 1 bores a drilling hole into a workpiece.

In the periphery of the cutting edge portion 2, chip evacuating flutes 4 are formed. The chip evacuating flutes 4 are open on front flanks 3 of the drill body 1 and are extended rearwards. In this embodiment, the chip evacuating flutes 4 are in a pair, and are rotationally symmetrical with respect to the axis O at the angle of 180 degrees. Further, wall surfaces of the chip evacuating flutes 4 facing the leading direction of the drill rotating direction T are rake faces 5, and cutting edges 6 are formed along ridge lines where the front flanks 3 intersect with the rake faces 5. Additionally, in this embodiment, the chip evacuating flutes 4 are formed with a helix shape in the trailing direction of the drill rotating direction T around the axis O toward the rear end side. Thus, a drill of this type is a so-called 'twist drill with two cutting edges'. Furthermore, a flank-flute connection portion 8 is formed between each of the front flanks 3 and each of the chip evacuating flutes 4 in the drill rotating direction T.

Here, in this embodiment, a thinning process is applied to a portion of the front flanks 3 on the trailing direction side in the drill rotating direction T, as if the portion were cut off from the inner periphery side of the drill body 1 to the outer periphery. Accordingly, thinning edges 6A are formed in the cutting edges 6 on the inner periphery side of the drill body 1. Along with the thinning edge 6A, the cutting edge 6 extends to a point of the front flanks 3 adjacent to the rotational center on the axis O, as shown in FIG. 1.

Furthermore, in this embodiment, from the thinning edge 6A to the outer periphery side, the cutting edge 6 has forms in the following order towards the outer periphery side, a curve convex in the leading direction of the drill rotating direction T, a curve concave in the trailing direction of the drill rotating direction T, and a curve which is also convex in the leading direction of the drill rotating direction T on the periphery side of the drill body 1 and reaches the outer periphery end of the cutting edge 6.

Additionally, these convex and concave curves composing the cutting edge 6, are smoothly connected with each other. Also, the convex curve positioned to the inner periphery side connects smoothly with the thinning edge 6A. A honed cutting edge is usable for the cutting edge 6.

On the other hand, the front flank 3 ranging from the cutting edge 6 in the trailing direction of the drill rotating direction T, provides at least two parts in the following order in the trailing direction of the drill rotating direction T, first front flank 3A recessed to the axis O in the trailing direction of the drill rotating direction T with first clearance angle α, and second front flank 3B with second clearance angle β which is greater than the first clearance angle α. In this embodiment, the cutting edge 6 is formed on a ridge line where the first front flank 3A intersects with the rake face 5, as well as where the second front flank 3B intersects with the rake face 5.

In this embodiment, third front flanks 3C whose clearance angle is greater than the second clearance angle β, are formed from the second front flank 3B in the trailing direction of the drill rotating direction T, and are also formed so as to connect with portions cut off by the thinning process.

Further, intersection lines L of the first front flanks 3A and the second flanks 3B cross the cutting edges 6, as shown in FIG. 1. In this embodiment, the intersectional lines L cross the cutting edges 6 since the intersection lines L cross the thinning edges 6A formed on the inner periphery side of the cutting edges 6.

The structure of this embodiment is detailed in the following. FIG. 1, is an end view in the direction of the axis O, that shows the intersection lines M of the second flanks 3B and the third flanks 3C, extend in a direction of a diameter so as to cross the axis O at the rotational center. The top view in the direction of the axis O also shows that the intersection lines L of the first flanks 3A and the second flanks 3B are parallel with the intersection lines M, are positioned on the leading direction side in the drill rotating direction T, and cross the cutting edges 6. Additionally, coolant holes 7 are open onto the third flanks 3C. In this embodiment, the first flanks 3A, the second flanks 3B and the third flanks 3C are inclined planes. Thus, the intersection lines L and M extend as straight lines.

In the drill with the aforementioned structure, in the outer periphery side of the drill body 1 from the crossing points where the cutting edges 6 cross the intersection lines L, the cutting edges 6 are formed in the forward direction of the drill rotating direction T along ridgelines of the first front flanks 3A having a first clearance angle α less than a second clearance angle β of the second front flanks 3B. Thus, as shown in FIG. 3, a wedge angle θ becomes greater in comparison with a case in which the cutting edges 6 are formed along ridgelines of the second front flanks 3B. Therefore, an increase in the strength of the cutting edge 6 can be achieved. Particularly, even in a case of high-speed cutting operation, uniform wear of the cutting edge 6 also can be achieved together while preventing occurrence of chipping.

In contrast, on the inner periphery side of the drill body 1, namely, on the rotational center side of the front flank 3, the cutting edges 6 are formed on the second front flanks 3B having the second clearance angle β greater than the first clearance angle α. Thus, an interruption of the front flanks 3 can be prevented at the rotational center. Therefore, an increase of wear caused by the interruption can be prevented around the rotational center, and an abnormal increase in thrust load can be also prevented. Thus, an increase of force for feeding the drill body 1 does not occur, and thus the drill body 1 is free from breakage caused by any excessive thrust.

Therefore, the drill with the aforementioned structure can prevent non-uniform wear and chipping from occurring in the cutting edge 6, in addition to breakage of the drill body 1. Further, minimizing the wear caused by interruption will make the tool life of the drill long. In other words, a long life drill, which enables a stable drilling operation to be maintained for a long term even if the drill is used for high-speed cutting operation, can be provided.

The drill of this embodiment has thinning edges 6A formed by applying a thinning process on the inner periphery side of the cutting edges 6, and the intersection lines L cross the thinning edges 6A of the cutting edges 6. Therefore, a majority part of the cutting edges 6, namely, over ½ of their length, are formed along the ridgelines between the first front flanks 3A and the rake faces 5; and thus further enhancement of strength of the cutting edges 6 can be achieved. Particularly, in a case of high-speed cutting, such strength can reliably prevent an occurrence of non-uniform wear and/or chipping, even on the outer periphery side of the cutting edges 6 wherein the peripheral velocity is higher than that of the inner periphery side.

In the first embodiment, the intersection lines L cross the thinning edges 6A of the cutting edges 6. On the other hand, in a second embodiment of this invention shown in FIG. 4, although the drill provides the thinning edges 6A, the intersection lines L do not cross the thinning edges 6A but cross the cutting edges 6 on the outer periphery side apart from the thinning edge 6A. This configuration is also usable. Further, in the second embodiment as shown in FIG. 4, the same components as those of the first embodiment shown in FIG. 1 and/or FIG. 3, will be denoted by the same reference numerals, and a detailed description thereof will be omitted.

Figure 4:
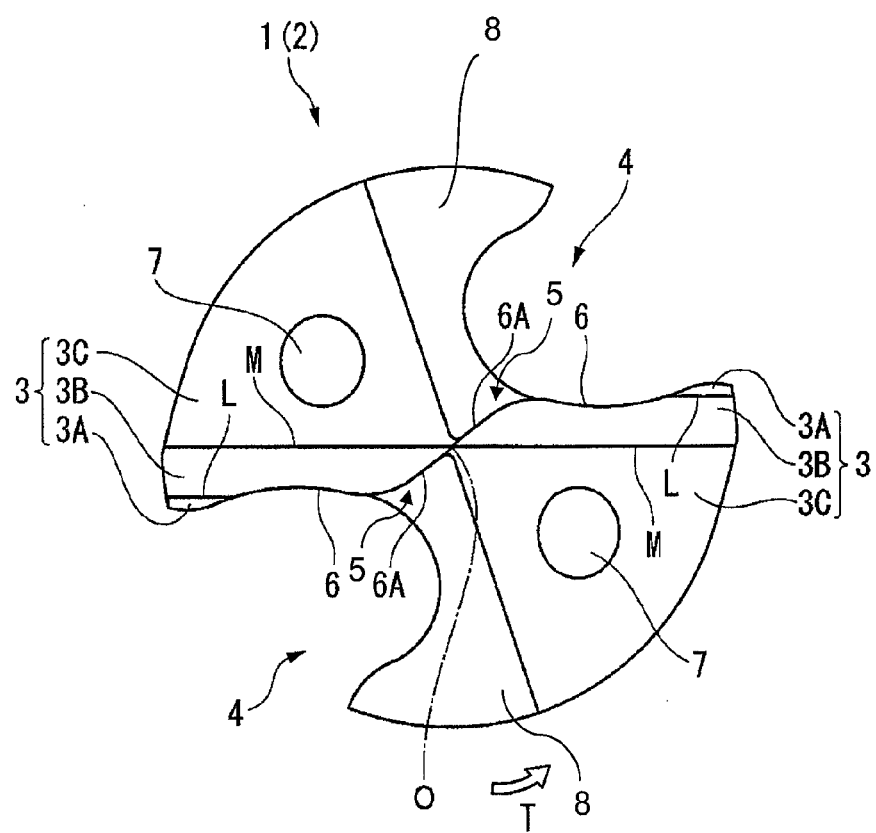
FIG. 4 is a front view of a drill that is a second embodiment of the present invention.

Here, in the second embodiment, as shown in FIG. 4, the intersection lines L of the first front flanks 3A and the second front flanks 3B, are formed so as to cross the concave curved portion of the cutting edges 6 having both concave and convex curved shapes in the outer periphery side from the thinning edges 6A. A length of the cutting edges 6 formed on the first front flanks 3A in the leading direction of the drill rotating direction T, is shorter than ½ of the length of the concave and convex curve on the outer periphery side from the thinning edge 6A to the outer periphery end.

In this second embodiment, sufficient strength of the cutting edges 6 is secured on their outer periphery side. Further, from the crossing points with the intersection lines L to the inner periphery side of the cutting edge 6, most of the cutting edges 6 including the thinning edges 6A can have a great second clearance angle β. Therefore, even if the drill is used for a high feed rate drilling in which a feed rate of the drill body 1 is high, interruption can be effectively prevented, and an increase of wear around the rotational center and/or an increase of thrust can be prevented.

In the first and second embodiments, the drill in which the thinning edges 6A are formed on the inner side of the cutting edges 6, has been explained. However, the present invention is also applicable to a drill without thinning edges. Further, in the first and second embodiments, the cutting edges 6 have the convex and concave curved shape in the outer periphery side from the thinning edges 6A in a top view along the axis O. However, the present invention is applicable to a drill in which the cutting edges 6 do not have a convex and concave curved shape but have a linear shape in a top view along the axis O. In such case, the intersection line L, which is not parallel to the intersection line M but is an oblique line crossing the cutting edge 6, is usable. Further, four or more front flanks may be formed on the front flank 3, and also two or more of intersection lines of the front flank may cross the cutting edge 6. [Mode for the Invention]

Figure 5:
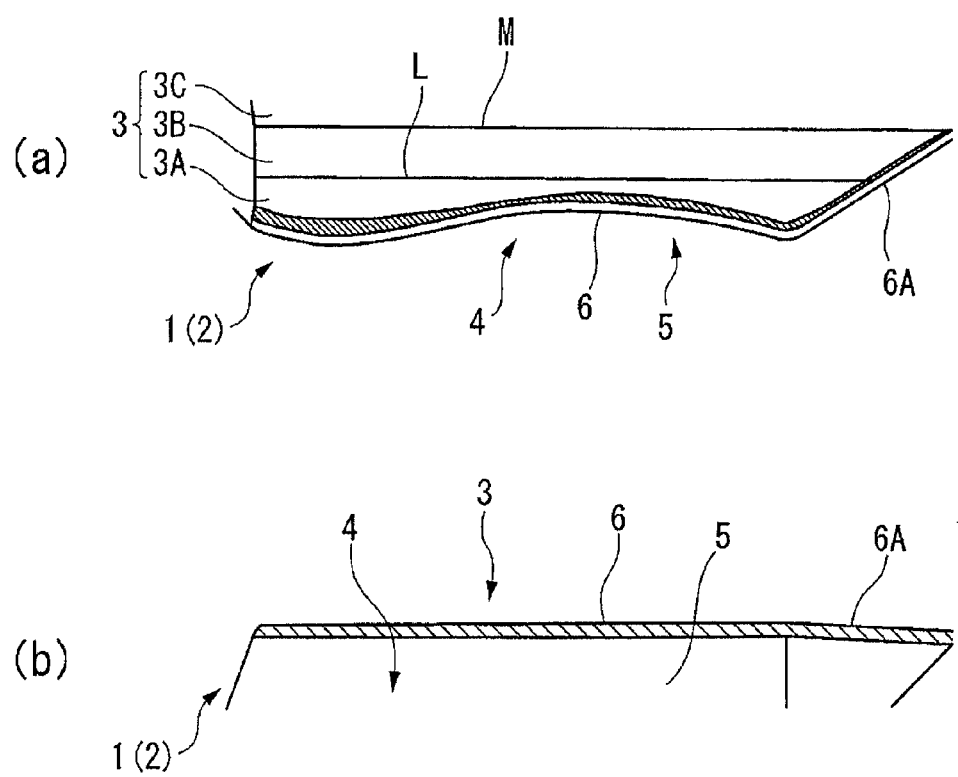
FIGS. 5(a) and 5(b) show a state of a cutting edge worn down by a drilling operation with a drill in a mode based on the first embodiment.

Next, the effectiveness of this invention will be described by showing a mode for the invention as an example. In the mode, a drill based on the aforementioned first embodiment drilled a workpiece under a high speed cutting condition. After drilling, a state of the cutting edge 6 worn down in the drilling operation was observed. FIG. 5 shows the result. The result for one of the cutting edges 6 (the cutting edge on the left side in FIG. 1), is shown in FIGS. 5 (a) and (b). FIG. 5 (a) is an enlarged front view as seen from the front flank 3 side thereof. FIG. 5 (b) is an enlarged side view thereof as seen from the rake face 5 side thereof. The worn down region is shown as the hatched region in FIGS. 5 (a) and (b).

In the drill body 1 of the aforementioned mode, the cutting edge 6 was 10 mm in diameter, was made of cemented carbide, and was coated with PVD coating on its surface. Also the first clearance angle α thereof was 2 degrees, the second clearance angle thereof was 12 degrees, and the clearance angle of the third front flank 3C was 25 degrees. Further, under the conditions of cutting speed Vc=200 m/min. and of feed Fr=0.27 mm/rev., the drill bored a drilling hole with length of 25 mm into the workpiece made of carbon steel S50C. While drilling, coolant was fed through the coolant holes at a pressure of 1 MPa. This drilling operation was carried out repeatedly until the total cutting length became 40 m.

Further, as a drill that is compared with the aforementioned mode, a first comparative example drill was prepared. The first comparative example drill provided a single flank formed in the leading direction of the drill rotating direction T from the intersection line M, which is of the second front flank 3B and the third front flank 3C the same as the aforementioned first embodiment, to the cutting edge 6. The clearance angle of this single front flank was 12 degrees, equal to the second clearance angle β in the embodiment.

Additionally, a second comparative example drill was prepared. The second comparative example drill also provided a single flank formed from the intersection line M to the cutting edge 6 in the leading direction of the drill rotating direction T. The clearance angle of this single front flank was 2 degrees, equal to the first clearance angle α in the embodiment. Using these comparative example drills, the drilling operation was carried out under the same conditions as the above mode.

Figure 6:
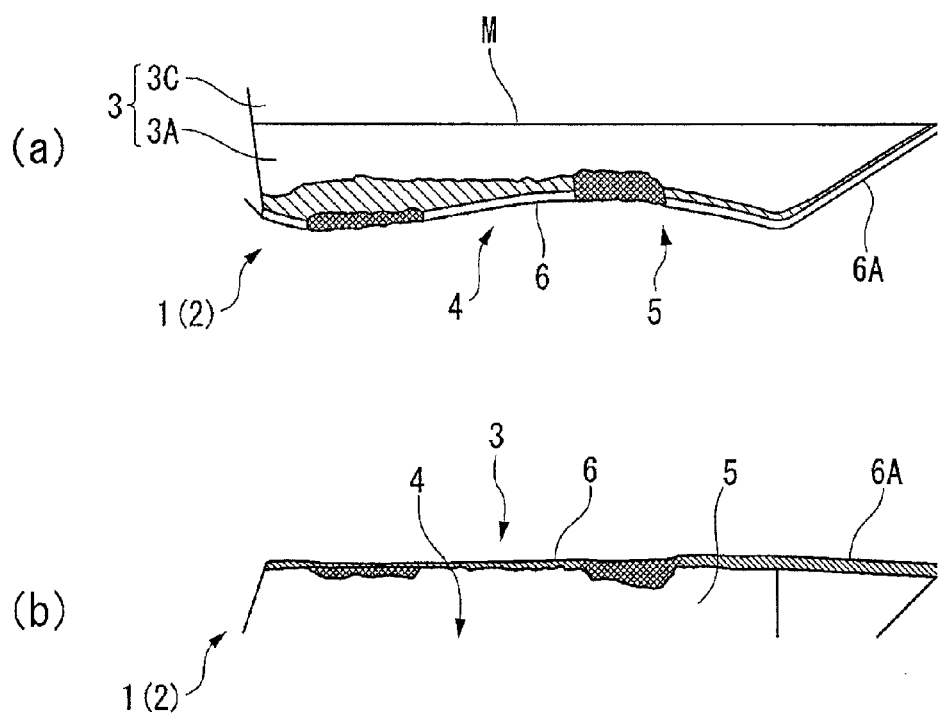
FIGS. 6(a) and 6(b) show a state of a cutting edge worn down by a drilling operation with a first comparative example drill that is compared with the mode shown in FIGS. 5(a) and 5(b).
Figure 7:
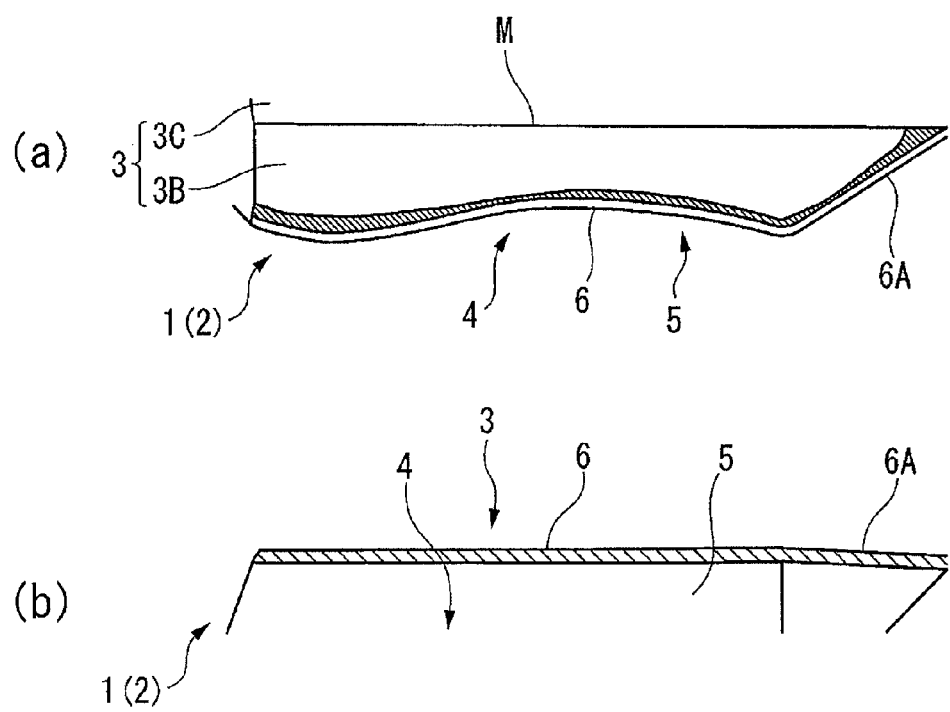
FIGS. 7(a) and 7(b) show a state of a cutting edge worn down by a drilling operation with a second comparative example drill that is compared with the mode shown in FIGS. 5(a) and 5(b).

The states of cutting edges 6 of the comparative example drills worn down after the above drilling operation are shown in FIGS. 6 and 7, respectively. In FIGS. 6 (a) and (b), and in FIGS. 7 (a) and (b), the worn down regions are shown as the hatched region the same as in FIG. 5. Also, the regions, where chippings occurred, are shown as the crosshatched region in FIGS. 6 (a) and (b). Further, in FIGS. 6 and 7, the parts including the front flanks 3A to 3C in which the first clearance angle α and the second clearance angle β are the same on the front flank 3, common to those of the first embodiment have the same reference numerals as the first embodiment.

The following results can be observed from FIGS. 5 through 7. Regarding the drill of the mode for the invention shown in FIG. 5, wear of the cutting edge 6 was approximately uniform throughout its length, and no abnormal damage and/or no chipping occurred thereon. On the other hand, regarding the first comparative example drill shown in FIG. 6, the clearance angle of the front flank 3 connected with the cutting edge 6 is equal to the second clearance angle β, namely, 12 degrees. Since such a great angle made the strength of the cutting edge weak, the flank wear became non-uniform and chipping also occurred. Also, regarding the second comparative example drill shown in FIG. 7, the clearance angle of the front flank 3 connected with the cutting edge 6 is equal to the first clearance angle α. In this drill, occurrence of chipping was not observed and wear of the cutting edge 6 was uniform in the outer periphery side. However, the flank wear was great around the rotational center on the inner periphery side, and cutting resistance increased.

INDUSTRIAL APPLICABILITY

The drill of this invention allows good drilling operations, since, during drilling operations, occurrence of non-uniform flank wear and/or of chipping can be prevented at the cutting edges, interruption of the flank is prevented on the inner periphery side, occurrence of wear around the rotational center can be also prevented, and an abnormal increase in thrust load can be checked.

The invention claimed is:

1. A drill comprising:
a drill body rotatable on an axis containing;
front flanks, each in the form of a single inclined plane,
chip evacuating flutes, which are open on said front flanks of the drill body and are extended rearwards, formed in a periphery of the drill body on its front side, said chip evacuating flutes having rake faces that face a drill rotating direction, and
at least one cutting edge formed along a ridge line where the front flanks intersect with the rake faces; and
flank-flute connection portions, each of which is formed between the front flank and the chip evacuating flute in the drill rotating direction; wherein
at least first and second front flanks are formed on the front flanks in order of their locations in the drill rotating direction from its leading side to its trailing side,
a clearance angle of the second front flank is greater than that of the first front flank,
an intersection line of the first and second front flanks crosses the cutting edge,
at least one third front flank is formed adjacent to the second front flank in the trailing direction of the drill rotating direction,
an intersection line of the second and third front flanks crosses the axis, and
each of the flank-flute connection portions is provided adjacent to the third front flank in the trailing direction of the drill rotating direction.

2. The drill according to claim 1, wherein
a thinning edge is formed on an inner periphery side of the cutting edge; and
the intersection line of the first and second front flanks crosses the thinning edge.

3. The drill according to claim 1, wherein
a thinning edge is formed on an inner periphery side of the cutting edge; and
the intersection line of the first and second front flanks crosses the cutting edge in an outer periphery side from the thinning edge.

4. The drill according to claim 1, wherein the cutting edge has at least one convex portion and at least one concave portion.

5. The drill according to claim 4, wherein
the convex portion is provided at a leading side of the drill rotating direction, and
the concave portion is provided at an inner peripheral side of the convex portion and is smoothly connected to the convex portion.

* * * * *